(12) United States Patent
Abramian

(10) Patent No.: US 11,338,927 B2
(45) Date of Patent: May 24, 2022

(54) FORWARD SWEPT WING AIRCRAFT WITH BOUNDARY LAYER INGESTION AND DISTRIBUTED ELECTRICAL PROPULSION SYSTEM

(71) Applicant: BOMBARDIER INC., Dorval (CA)

(72) Inventor: Martin Abramian, Richmond Hill (CA)

(73) Assignee: BOMBARDIER INC., Dorval (CA)

( * ) Notice: Subject to any disclaimer, the term of this patent is extended or adjusted under 35 U.S.C. 154(b) by 219 days.

(21) Appl. No.: 16/708,711

(22) Filed: Dec. 10, 2019

(65) Prior Publication Data
US 2020/0189758 A1    Jun. 18, 2020

Related U.S. Application Data

(60) Provisional application No. 62/779,774, filed on Dec. 14, 2018.

(51) Int. Cl.
*B64D 27/24* (2006.01)
*B64C 39/12* (2006.01)
*B64D 27/20* (2006.01)
*B64D 27/02* (2006.01)

(52) U.S. Cl.
CPC .............. *B64D 27/24* (2013.01); *B64C 39/12* (2013.01); *B64D 27/20* (2013.01); *B64D 2027/026* (2013.01)

(58) Field of Classification Search
CPC .......... B64C 39/12; B64D 27/14; B64D 27/20
See application file for complete search history.

(56) References Cited

U.S. PATENT DOCUMENTS

| | | | | |
|---|---|---|---|---|
| 3,194,516 A | * | 7/1965 | Messerschmitt | B64D 27/20 244/74 |
| 3,576,300 A | * | 4/1971 | Palfreyman | B64D 27/20 244/36 |
| 3,936,017 A | * | 2/1976 | Blythe | B64D 33/06 244/110 B |
| 4,629,147 A | * | 12/1986 | Johnson, Jr | B64D 27/14 244/55 |
| 4,767,083 A | | 8/1988 | Koenig et al. | |
| 5,114,097 A | * | 5/1992 | Williams | B64D 33/02 244/119 |

(Continued)

FOREIGN PATENT DOCUMENTS

| | | | | |
|---|---|---|---|---|
| CH | 700723 B1 | * | 10/2010 | B64C 39/10 |
| DE | 102008024463 A1 | * | 12/2009 | B64D 27/20 |
| WO | WO-8603172 A1 | * | 6/1986 | B64C 1/00 |

OTHER PUBLICATIONS

Airbus/Rolls-Royce E-Thrust Brochure, Airbus Group, May 2014.

*Primary Examiner* — Joseph W Sanderson
(74) *Attorney, Agent, or Firm* — Norton Rose Fulbright Canada

(57) ABSTRACT

An aircraft including a fuselage extending along a longitudinal axis; forward swept wings extending from the fuselage; at least one horizontal stabilizer secured to the fuselage; and a distributed electrical propulsion system operatively connected to an electrical power source. The distributed electrical propulsion system have an air intake located rearward of an intersection between the forward swept wings and the fuselage open to a boundary layer region on a surface of the fuselage.

17 Claims, 3 Drawing Sheets

(56) References Cited

U.S. PATENT DOCUMENTS

| | | | | |
|---|---|---|---|---|
| 5,899,409 A * | 5/1999 | Frediani | | B64C 39/068 |
| | | | | 244/13 |
| 5,957,405 A * | 9/1999 | Williams | | B64C 5/06 |
| | | | | 244/15 |
| 6,102,332 A * | 8/2000 | Haxton | | B64C 39/10 |
| | | | | 244/118.2 |
| 6,834,495 B2 * | 12/2004 | Saito | | F02C 3/10 |
| | | | | 60/224 |
| 7,410,122 B2 | 8/2008 | Robbins et al. | | |
| 7,735,774 B2 * | 6/2010 | Lugg | | B64C 29/0066 |
| | | | | 244/12.3 |
| 7,900,865 B2 * | 3/2011 | Moore | | B64D 27/14 |
| | | | | 244/1 N |
| 8,152,095 B2 * | 4/2012 | Cazals | | B64C 5/02 |
| | | | | 244/55 |
| 8,636,241 B2 | 1/2014 | Lugg et al. | | |
| D735,633 S * | 8/2015 | Viala | | D12/319 |
| 9,567,062 B2 * | 2/2017 | Chandler | | B64C 5/06 |
| 9,694,906 B1 | 7/2017 | Sadek | | |
| 10,352,274 B2 * | 7/2019 | Suciu | | F02C 3/10 |
| 10,358,229 B2 * | 7/2019 | Moxon | | B64D 27/02 |
| 10,549,845 B2 * | 2/2020 | Epstein | | B64C 21/06 |
| 10,633,101 B2 * | 4/2020 | Negulescu | | B64C 1/16 |
| 11,001,378 B2 * | 5/2021 | Evulet | | B64D 27/16 |
| 2003/0146344 A1 * | 8/2003 | Saito | | F02C 6/08 |
| | | | | 244/55 |
| 2008/0142641 A1 * | 6/2008 | Moore | | B64D 27/20 |
| | | | | 244/215 |
| 2009/0084889 A1 * | 4/2009 | Cazals | | B64D 33/06 |
| | | | | 244/12.1 |
| 2010/0012773 A1 * | 1/2010 | Im | | B64C 3/10 |
| | | | | 244/36 |
| 2014/0054413 A1 * | 2/2014 | Cazals | | B64D 27/14 |
| | | | | 244/54 |
| 2014/0367510 A1 * | 12/2014 | Viala | | B64C 1/26 |
| | | | | 244/62 |
| 2015/0336655 A1 * | 11/2015 | Chandler | | B64C 39/10 |
| | | | | 244/45 A |
| 2016/0332741 A1 * | 11/2016 | Moxon | | B64D 33/04 |
| 2017/0361939 A1 * | 12/2017 | Negulescu | | B64D 27/20 |
| 2017/0369152 A1 * | 12/2017 | Yao | | B64D 27/26 |
| 2018/0051654 A1 * | 2/2018 | Suciu | | F02C 7/36 |
| 2018/0305007 A1 * | 10/2018 | Evulet | | B64C 39/12 |
| 2018/0339765 A1 * | 11/2018 | Epstein | | B64C 23/02 |
| 2018/0354634 A1 * | 12/2018 | Jodet | | B64D 27/14 |
| 2020/0331589 A1 * | 10/2020 | Cummings | | B64C 15/00 |

* cited by examiner

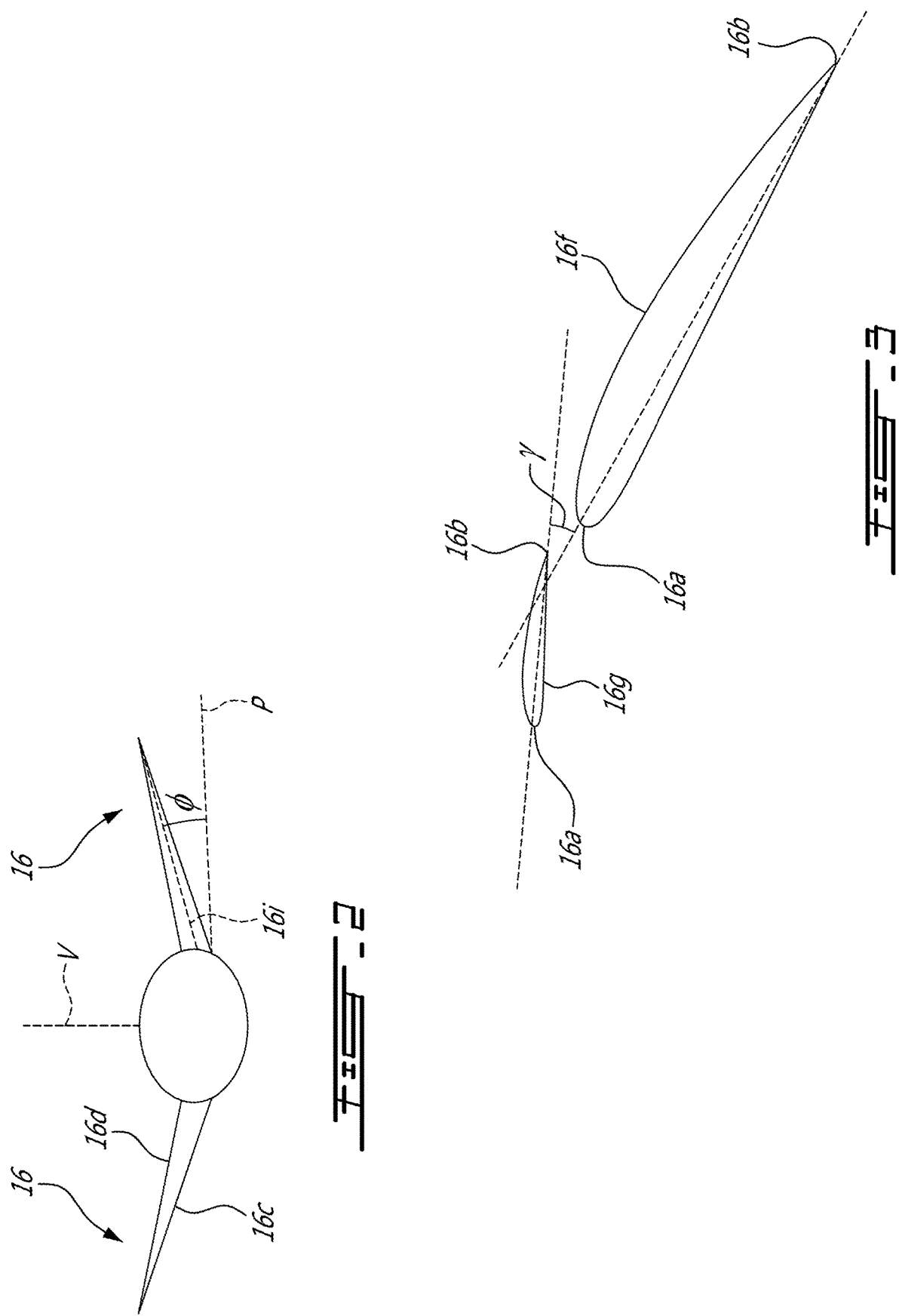

FORWARD SWEPT WING AIRCRAFT WITH BOUNDARY LAYER INGESTION AND DISTRIBUTED ELECTRICAL PROPULSION SYSTEM

CROSS-REFERENCE TO RELATED APPLICATION

This application claims priority from U.S. Patent Application No. 62/779,774 filed Dec. 14, 2018, the entire contents of which are incorporated herein by reference.

TECHNICAL FIELD

The application relates generally to aircrafts and, more particularly, to improved high performance aircrafts.

BACKGROUND

Continuous effort has been made to improve the designs of commercial and business aircrafts, in an effort to obtain marginal improvements in range, fuel consumption, performance, and the like. However, the overall convention design of such commercial and business aircraft has not drastically changed in decades. Consequently, air framers have started to direct their efforts toward developing new aircraft designs that might offer better aerodynamic performance and decreased fuel consumption. Particularly, new aircraft designs are sought which may provide improved high and low speed performance, while increasing range (and/or decreasing fuel consumption).

SUMMARY

There is accordingly provided, in accordance with a first aspect, an aircraft comprising: a fuselage extending along a longitudinal axis; forward swept wings extending from the fuselage; at least one horizontal stabilizer secured to the fuselage; and a distributed electrical propulsion system operatively connected to an electrical power source, the distributed electrical propulsion system having an air intake located rearward of an intersection between the forward swept wings and the fuselage and open to a boundary layer region on a surface of the fuselage.

The above-defined aircraft of the first aspect may also include one or more of the following addition elements and/or limitations of existing elements, in whole or in part, and in any combination:

at least one combustion engine in driving engagement with at least one generator, the electrical power source being the at least one generator;

at least one combustion engine that is a gas turbine engine;

the fuselage defines an air inlet fluidly connected to an inlet of the gas turbine engine, the air inlet opening to the boundary layer region;

the air inlet circumferentially extends around the fuselage;

a sweep angle of the forward swept wings that extends from the wings to a lateral axis perpendicular to the longitudinal axis, the sweep angle ranging from 10 to 45 degrees;

a dihedral angle of the forward swept wings that extends from a plane containing both of the longitudinal axis and a lateral axis perpendicular to the longitudinal axis to a mid-plane between pressure and suction sides of the wings, the dihedral angle ranging from −3 to 5 degrees;

a cross-section of the fuselage taken on a plane normal to the longitudinal axis that is elliptical;

the air intake of the distributed electrical propulsion system has a substantially rectangular shape;

the distributed electrical propulsion system includes a plurality of electrical fans disposed side-by-side;

a plurality of electrical fans that includes at least four electrical fans.

at least one combustion engine and at least one generator that include two combustion engines and two generators each drivingly engaged by a respective one of the two combustion engines; and the at least one horizontal stabilizer is a canard-type horizontal stabilizer located forward of the forward swept wings.

There is also provided, in accordance with a second aspect, an aircraft comprising: a fuselage extending along a longitudinal axis, the fuselage defining a payload section and an engine section; forward swept wings extending from the fuselage, the forward swept wings having roots rearward of tips thereof; at least one horizontal stabilizer secured to the fuselage; a vertical and horizontal stabilizer assembly secured to the fuselage and located at a rear end thereof; and a plurality of electric fans disposed side-by-side and being operatively connected to a source of electricity, inlets of the plurality of electric fans fluidly connected to an air intake located rearward of the forward swept wings and receiving air from a boundary layer region of the aircraft.

The above-defined aircraft of the second aspect may also include one or more of the following addition elements and/or limitations of existing elements, in whole or in part, and in any combination:

at least one combustion engine located in the engine section of the fuselage and in driving engagement with at least one generator, the electrical power source being the at least one generator;

the at least one combustion engine is at least one gas turbine engine;

the fuselage defines an air inlet fluidly connected to an inlet of the gas turbine engine, the air inlet opening to the boundary layer region;

the air inlet circumferentially extends around the fuselage;

a sweep angle of the forward swept wings that extends from the wings to a lateral axis perpendicular to the longitudinal axis, the sweep angle ranging from 10 to 45 degrees;

a dihedral angle of the forward swept wings that extends from a plane containing both of the longitudinal axis and a lateral axis perpendicular to the longitudinal axis to a mid-plane between pressure and suction sides of the wings, the dihedral angle ranging from −3 to 5 degrees;

the air intake of the distributed electrical propulsion system has a substantially rectangular shape; and the at least one horizontal stabilizer is a canard-type horizontal stabilizer located forward of the roots of the forward swept wings.

BRIEF DESCRIPTION OF THE DRAWINGS

Reference is now made to the accompanying figures in which:

FIG. 2 is a schematic cross-sectional view of the aircraft of FIG. 1, taken along a plane normal to a longitudinal axis of the aircraft;

FIG. 3 is a schematic cross-sectional view of the tip and root sections of one of the wings of the aircraft of FIG. 1.

DETAILED DESCRIPTION

Figure 1:
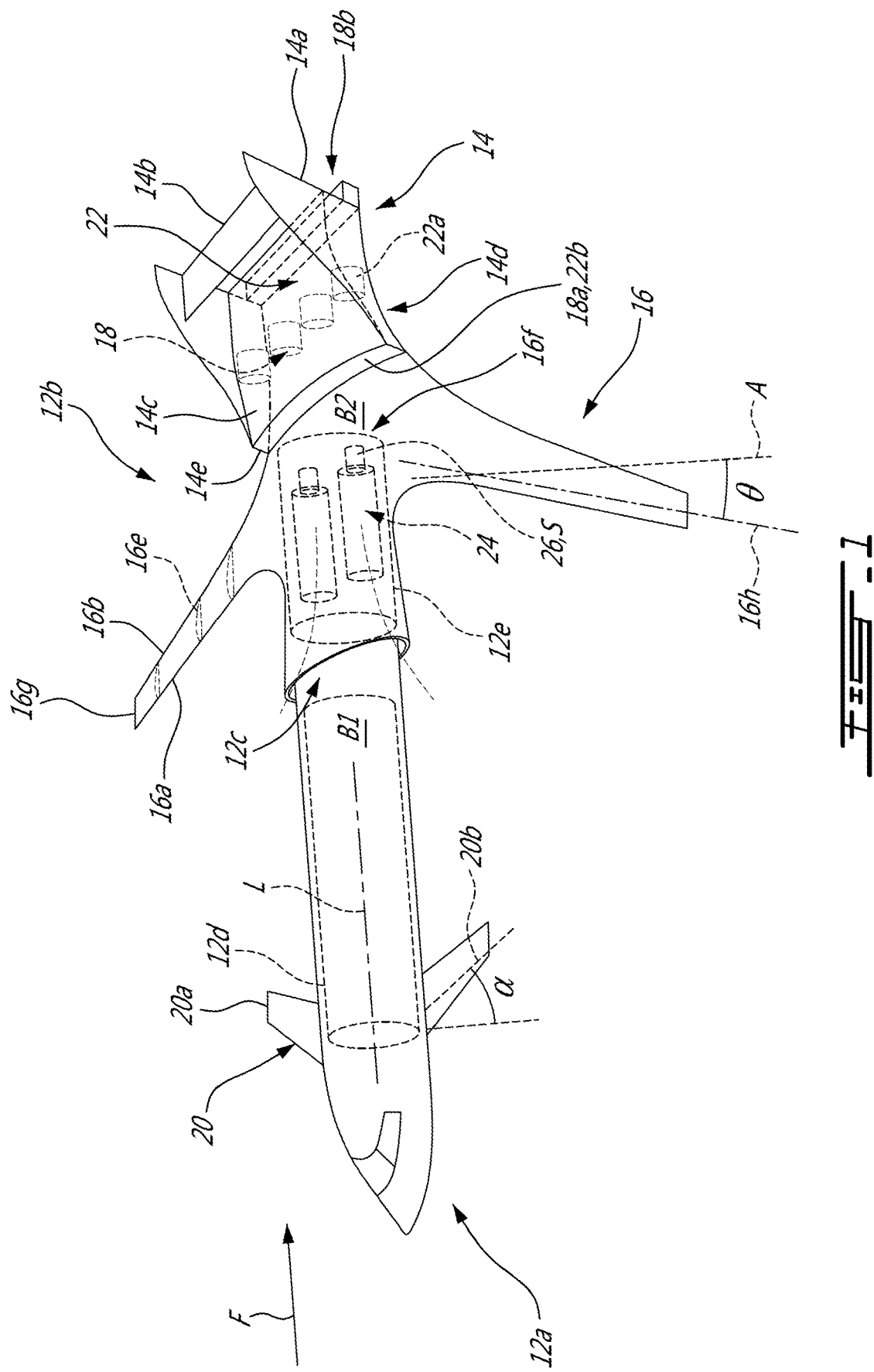
FIG. 1 is a schematic three-dimensional view of an aircraft in accordance with one embodiment of the present disclosure.

Referring to the drawings and more particularly to FIG. 1, an aircraft is shown at 10, and is generally described to illustrate some components for reference purposes in the present disclosure. The aircraft 10 has a fuselage 12 having a fore end 12a at which a cockpit is located, and an aft end 12b supporting an empennage or tail assembly 14. The fuselage 12 extends along a longitudinal axis L. The aircraft 10 further has wings 16 extending from the fuselage 12. A cross-section of the fuselage 16 taken on a plane normal to the longitudinal axis L may be elliptical.

The fuselage 12 defines a fuselage air inlet 12c. As shown in the FIG. 1, the fuselage air inlet 12c circumstantially extends around at least a portion of a circumference of the fuselage 12. The fuselage air inlet 12c opens to a first boundary layer region B1 of a surface of the fuselage 12. The fuselage air inlet 12c may be annular and may be contained in a plane normal to the longitudinal axis L. The fuselage air inlet 12c is oriented toward the fore end 12a of the fuselage 12.

In the embodiment shown, the fuselage 12 defines a payload section 12d and an engine section 12e. The payload section 12d may be configured for receiving for instance passengers and/or cargo. The engine section 12e may be located aft of the payload section 12d. In the embodiment shown, the engine section 12e is located between the payload section 12d and the tail assembly 14 of the aircraft 10. As shown in FIG. 1, the fuselage air inlet 12c is located between the engine and payload sections 12d, 12e. The fuselage air inlet 12c may be located forward of the engine section 12c. The fuselage air inlet 12c is configured for allowing air from the first boundary layer region B1 of the fuselage 12 to penetrate in the engine section 12e. More information about this aspect is presented herein below.

The wings 16 have leading edges 16a and trailing edges 16b rearward, and downstream of, the leading edges 16a. The wings 16 have pressure sides 16c (FIG. 2) and suctions sides 16d (FIG. 2) being opposite to the pressure sides 16c and extending from the leading edges 16a to the trailing edges 16b. Each of the wings 16 is defined by a plurality of airfoil sections 16e distributed from a root 16f to a tip 16g thereof. The chord lines of the airfoil sections 16e extend from the leading edges 16a to the trailing edges 16b and may decrease from the roots 16f to the tips 16g. A taper ratio of the wings 16 is defined as the chord line of the wings 16 at the tip 16g divided by the chord line of the wings at the roots 16f. In the embodiment shown, the taper ratio ranges from 0.2 to 0.5. In a particular embodiment, the taper ratio ranges from 0.29 to 0.31.

The aircraft 10 is known as a forward swept wing aircraft. In such an aircraft, the wings 16 extend from the roots 16f located at the fuselage 12 to the tips 16g being distal to the fuselage 12; the tips 16g being forward of the roots 16f. In other words, the wings 16 extend forwardly toward the fore end 12a of the fuselage 12 from their roots 16f to their tips 16g. This is different than conventional aircraft in which the wings extend toward the tail assembly. A sweep angle θ of a wing 16 is defined between the wing 16 and a lateral axis A of the aircraft 10 being perpendicular to the longitudinal axis L. More specifically, the sweep angle θ extends from the lateral axis A to quarter-chord lines 16h of the wings 16. The quarter-chord line 16h is defined by a line extending through a series of points each located at a quarter of a chord line from the leading edge 16a of each of the wing sections 16e. The chord line of each of the wing sections 16e extends from the leading edge 16a to the trailing edge 16b of the wing 16. The sweep angle θ extends from the quarter-chord line 16h to the lateral axis A of the aircraft 10. In the embodiment shown, the sweep angle θ ranges from 10 to 45 degrees. In a particular embodiment, the sweep angle θ ranges from 25 to 30 degrees.

Referring now to FIG. 2, the wings 16 may define a dihedral angle φ. The dihedral angle φ corresponds to an angle extending from a plane P containing both of the longitudinal and lateral axes L, A of the aircraft 10 to the wings 16. The plane P may be parallel to a ground when the aircraft 10 is supported by the ground. More specifically, the dihedral angle φ extends from the plane P containing the longitudinal and lateral axes L, A to mid-planes 16i of the wings 16 located half-way between their pressure and suction sides 16c, 16d. In the depicted embodiment, the dihedral angle φ ranges from −3 to 5 degrees. In a particular embodiment, the dihedral angle φ ranges from 3 to 5 degrees. In the embodiment shown, the aircraft 10 has a positive dihedral angle which means that the wings 16 extend, or slope, upwardly and away from the ground from its root to its tip. This is contrary to a negative dihedral angle in which the wings tend to slope toward the ground.

Referring now to FIG. 3, the airfoil sections of one of the wings at the root 16f and at the tip 16g are shown for one of the wings 16 with actual relative orientation. Each of the airfoil sections has a chord line extending from the leading edge 16a to the trailing edge 16b of the wings 16. For illustration purposes, the chord lines of each of the root and tip sections 16f, 16g are shown in dashed line and are prolonged beyond the leading and trailing edges 16a, 16b. As illustrated, the chord lines of the two airfoil sections are not parallel to one another. This implies that the wings 16 have a twist angle γ defined between the chord lines of the airfoil sections at the root and the tip 16f, 16g. In the embodiment shown, the twist angle γ ranges from 0 to 6 degrees. In a particular embodiment, the twist angle γ ranges from 3 to 5. In a particular embodiment, the wings have a twist angle of 0.

Referring back to FIG. 1, the tail assembly 14 includes vertical 14a and horizontal 14b stabilizers. More specifically, the tail assembly 14 includes two vertical stabilizers 14a disposed at opposite lateral ends of the tail assembly 14; the horizontal stabilizer 14b extending from one of the vertical stabilizers 14a to the other. In the embodiment shown, the horizontal stabilizer 14b is secured to the vertical stabilizers 14a between their roots and their tips.

The tail assembly 14 includes an upper wall 14c, a lower wall 14d opposite the upper wall 14c and spaced apart therefrom, and side walls 14e extending from the upper wall 14c to the lower wall 14d. In the embodiment shown, the vertical stabilizers 14a define the side walls 14e. Stated otherwise, both of the upper and lower walls 14c, 14d are connected to the vertical stabilizers 14a.

The upper, lower, and side walls 14c, 14d, 14e enclose an engine compartment 18 having an inlet 18a and an outlet 18b. As shown, the inlet 18a faces the fore end 12a of the fuselage 12 whereas the outlet 18b is oriented away from the fore end 12a of the fuselage 12. A shape of the inlet 18a and of the outlet 18b may substantially rectangular. In other words, both of the inlet and the outlet 18a, 18b of the engine compartment 18 have a width taken along the lateral axis A greater than a height taken along a vertical axis V (FIG. 2) perpendicular to both of the longitudinal and lateral axes L, A.

In the depicted embodiment, the inlet 18a of the engine compartment 18 opens to a second boundary layer region B2 located on a surface of the fuselage 12 of the aircraft 10. The second boundary layer region B2 is located downstream of the first boundary layer region B1 relative to a flow of air F circulating around the aircraft 10. Stated otherwise, the engine compartment 18 is fluidly connected to the second boundary layer region B2. Further details about this aspect are presented herein below. The inlet 18a of the engine compartment 18 is located rearward of an intersection between the forward swept wings 16 and the fuselage 12.

Still referring to FIG. 1, the aircraft 10 includes a forward horizontal stabilizer 20 being of a canard-type stabilizer and referred to herein below as a canard. The canard 20 is located proximate the fore end 12a of the fuselage 12. The canard 20 is located between the fore end 12a of the fuselage 12 and the roots 16f of the wings 16. In the embodiment shown, the canard 20 includes two wings 20a disposed on opposite sides of the fuselage 12. Each of the two wings 20a of the canard 20 may define a sweep angle α defined from a quarter-chord line 20b of the wings 20a of the canard 20 to the lateral axis A of the aircraft 10. The canard 20 may or may not have a twist angle different than zero, a dihedral angle different than zero, and/or a taper ratio different than one.

Referring back to FIG. 1, for propelling the aircraft, said aircraft is equipped with a distributed electrical power system 22 received within the engine compartment 18 of the tail assembly 14. In the embodiment shown, the distributed electrical power system 22 includes electric fans 22a. One or more electric fans 22a may be used. In the embodiment shown, four electric fans 22a are used and disposed side-by-side. Each of the electric fans 22a is operatively connected to an electrical power source S. In a particular embodiment, the distributed electrical power system 22 includes six fans, three on each sides of the fuselage and aft of the wings. Number and diameters of the fans may be a function of overall design parameters of the aircraft 10.

The distributed electrical propulsion system 22 has an air intake 22b that corresponds to the inlet 18a of the engine compartment 18. In other words, the air intake 22b of the distributed electrical propulsion system 22 opens to the second boundary layer region B2 of the aircraft 10. Each of the electric fans 22a has an inlet fluidly connected to the second boundary layer region B2 via the inlet 18a of the engine compartment 18. Each of the electric fans 22a has an outlet fluidly connected to the outlet 18b of the engine compartment 18.

Figure 4:
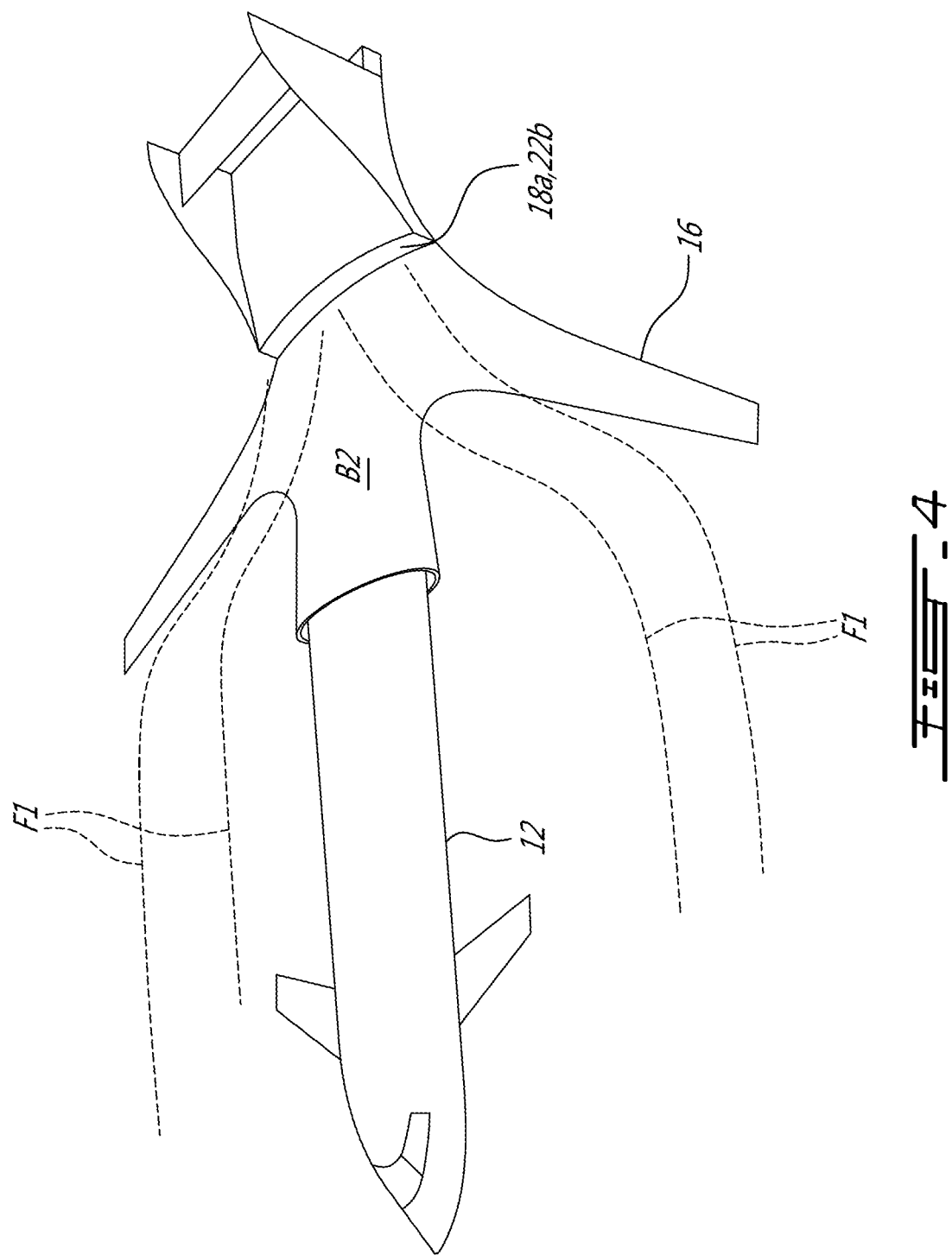
FIG. 4 is another schematic three-dimensional view of the aircraft of FIG. 1, showing airflow thereon.

Referring also to FIG. 4, in the embodiment shown, and in operation, the distributed electrical propulsion system 22 is configured to draw air from the second boundary layer region B2 for ingesting at least a portion of the boundary layer that develops over the surface of the fuselage 12. In a particular embodiment, air in the second boundary layer region B2 comes from the boundary layer that develops over the surface of the wings 16. As shown in FIG. 4, a portion F1 of the flow F over the wings 16 is deviated inward toward the fuselage 12, due to the forward-swept nature of the wings 16, and enters the second boundary layer region B2 on the fuselage. As shown, the wings 16, by being forward swept, contribute in increasing the quantity of air circulating through the second boundary layer region B2 and to thereby help increase a mass flow rate of air entering the inlet 18a of the engine compartment 18. In comparison with a plane having conventional, rearward swept, wings, this configuration (i.e. the forward swept wings 16 and the air intake 22b of the distributed electrical propulsion system 22 located rearward of an intersection between the forward swept wings 16 and the fuselage 12) may thus provide greater mass flow of the air being directed into the inlet air intake 22b.

In a particular embodiment, ingesting at least a portion of the boundary layer decreases a drag force exerted by the flow of air F around the aircraft 10 and increases, or improves, aerodynamic performance of the aircraft 10 compared to a configuration not configured to ingest the boundary layer.

In the embodiment shown, the forward-swept wings 16 converge toward the air intake 22b of the distributed electrical propulsion system 22 and might deflect at least a portion of the flow of circulating around the aircraft 10 toward the distributed electrical propulsion system 22.

In the depicted embodiment, the aircraft 10 includes at least one combustion engine 24 that may be located in the engine section 12e of the fuselage 12. The at least one combustion engine 24 is in driving engagement with at least one generator 26 for generating electrical power to power the electric fans 22a of the distributed electrical propulsion system 22. In the embodiment shown, the electrical power source S of the aircraft 10 corresponds to the at least one generator 26. Alternatively, the electrical power source S may be batteries.

In the embodiment shown, the at least one combustion engine 24 includes two combustion engines 24 that may be disposed side-by-side in the engine section 12e of the fuselage 12. Each of the two gas turbine engines 24 are in driving engagement with a respective one of two generators 26. The combustion engines 24 may be gas turbine engines. Any other suitable engine may be used without departing from the scope of the present disclosure.

Each of the two gas turbine engines 24 have an inlet fluidly connected to the fuselage air inlet 12c and to the first boundary layer region B1. In other words, the inlets of the gas turbine engines 24 are in fluid flow communication with the first boundary layer region B1 of the aircraft 10 via the fuselage air inlet 12c. In operation, the gas turbine engines 24 are configured to draw air from the first boundary layer region B1 for ingesting at least a portion of the boundary layer that develops over the surface of the fuselage 12. In a particular embodiment, ingesting at least a portion of the boundary layer decreases a drag force exerted by the flow of air F around the aircraft 10 and increases, or improves, aerodynamic performance of the aircraft compared to a configuration not configured to ingest the boundary layer.

In a particular embodiment, a combination of the boundary layer ingestion by the air intake of the distributed electrical propulsion system 22 and the wings 16 being forward swept offers benefits in terms of aircraft performance. These benefits may be, for instance, power saving improved wing performance at low speed. In a particular embodiment, the wings, due to their inverse spanwise gradient allow their highest loaded region to be subjected to boundary layer ingestion. For low speed characteristics this might reduce the wing adverse pressure gradient. For high speed characteristics, this might have an adverse effect if a speed of the air entering the air intake of the distributed electrical propulsion system is lower than that of the flow of air circulating around the aircraft and might result in an expanding stream tube and hence a back pressure which could enhance shock strength. In a particular embodiment, the aircraft is designed such that the intake is not a blocked region at the wing trailing edge. The design parameters of the aircraft might all be a function of the speed of the aircraft relative to the speed at the inlet of the fan. For example, with current engines, during take-off, a cross-sectional area of a stream tube ingested by the engine decreases toward the engine. This is referred to as a converging stream tube. A converging stream tube appears when the speed of the aircraft is less than that of an airflow being ingested into the engine intake at a maximum power of the engine. During cruise, a diverging stream tube is present since the aircraft speed is higher than the speed of the airfoil being ingested into the engine intake.

The forward swept wings 16 allow for a loading distribution from tip to the root where the highest loading occurs at the wing. This might allow for improved low speed stall characteristics compared to a configuration having rearward swept wings by maintaining tip control. The tip-to-root loading characteristics of the forward swept wings might allow a higher level boundary layer ingestion compared to a configuration having rearward swept wings. This boundary layer ingestion might allow for a reduction in the propulsion power requirement compared to a configuration lacking boundary layer ingestion. The boundary layer ingestion at the end of the forward swept wings might be designed to act as a boundary layer control and might improve the loading characteristic at the root section of the wings. The combination of forward swept wings and boundary layer ingestion might provide an aerodynamic concept being more efficient than conventional configurations and which might take advantage of the combined interaction of all three concepts (i.e., boundary layer ingestion, distributed electrical propulsion system, and forward swept wings) and might result in a significantly improved high speed performance and low speed characteristics compared to a conventional aircraft lacking these concepts.

For operating the aircraft, a flow of air flowing around the forward swept wings is deflected toward the ground for maintaining the aircraft off the ground. A spanwise component is imparted to the flow of air airflows such that the flow of air moves toward the fuselage of the aircraft. A portion of the flow of air located in the boundary layer region on the outer surface of the fuselage and downstream of the intersection between the fuselage and the forward swept wings is ingested. The ingested portion of the flow of air is accelerated via the electric fans.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft comprising:
a fuselage extending along a longitudinal axis, the fuselage defining an air inlet;
forward swept wings extending from the fuselage from roots to tips, the air inlet located forward of the roots of the forward swept wings;
at least one horizontal stabilizer secured to the fuselage;
a distributed electrical propulsion system operatively connected to an electrical power source, the distributed electrical propulsion system having an air intake located rearward of an intersection between the forward swept wings and the fuselage and open to a boundary layer region on a surface of the fuselage; and
at least one combustion engine in driving engagement with at least one generator, the electrical power source being the at least one generator, the air inlet fluidly connected to an inlet of the at least one combustion engine, the air inlet opening to the boundary layer region.

2. The aircraft of claim 1, wherein the at least one combustion engine is at least one gas turbine engine.

3. The aircraft of claim 1, wherein the air inlet circumferentially extends around the fuselage.

4. The aircraft of claim 1, wherein a sweep angle of the forward swept wings extends from the wings to a lateral axis perpendicular to the longitudinal axis, the sweep angle ranging from 10 to 45 degrees.

5. The aircraft of claim 1, wherein a dihedral angle of the forward swept wings extends from a plane containing both of the longitudinal axis and a lateral axis perpendicular to the longitudinal axis to a mid-plane between pressure and suction sides of the wings, the dihedral angle ranging from −3 to 5 degrees.

6. The aircraft of claim 1, wherein a cross-section of the fuselage taken on a plane normal to the longitudinal axis is elliptical.

7. The aircraft of claim 1, wherein the air intake of the distributed electrical propulsion system has a substantially rectangular shape.

8. The aircraft of claim 1, wherein the distributed electrical propulsion system includes a plurality of electrical fans disposed side-by-side.

9. The aircraft of claim 1, wherein the at least one combustion engine and the at least one generator includes two combustion engines and two generators each drivingly engaged by a respective one of the two combustion engines.

10. The aircraft of claim 1, wherein the at least one horizontal stabilizer is a canard-type horizontal stabilizer located forward of the forward swept wings.

11. An aircraft comprising:
a fuselage extending along a longitudinal axis, the fuselage defining a payload section and an engine section, the fuselage defining an air inlet;
forward swept wings extending from the fuselage, the forward swept wings having roots rearward of tips thereof, the air inlet located forward of the roots of the forward swept wings;
at least one horizontal stabilizer secured to the fuselage;
a vertical and horizontal stabilizer assembly secured to the fuselage and located at a rear end thereof;
a plurality of electric fans disposed side-by-side and being operatively connected to a source of electricity, inlets of the plurality of electric fans fluidly connected to an air intake located rearward of the forward swept wings and receiving air from a boundary layer region of the aircraft; and
at least one combustion engine located in the engine section of the fuselage and in driving engagement with at least one generator, the electrical power source being the at least one generator, the air inlet of the fuselage being fluidly connected to an inlet of the at least one combustion engine, the air inlet opening to the boundary layer region.

12. The aircraft of claim 11, wherein the at least one combustion engine is at least one gas turbine engine.

13. The aircraft of claim 12, wherein the air inlet circumferentially extends around the fuselage.

14. The aircraft of claim 11, wherein a sweep angle of the forward swept wings extends from the wings to a lateral axis perpendicular to the longitudinal axis, the sweep angle ranging from 10 to 45 degrees.

15. The aircraft of claim 11, wherein a dihedral angle of the forward swept wings extends from a plane containing both of the longitudinal axis and a lateral axis perpendicular to the longitudinal axis to a mid-plane between pressure and suction sides of the wings, the dihedral angle ranging from −3 to 5 degrees.

16. The aircraft of claim 11, wherein the air intake of the distributed electrical propulsion system has a substantially rectangular shape.

17. The aircraft of claim 11, wherein the at least one horizontal stabilizer is a canard-type horizontal stabilizer located forward of the roots of the forward swept wings.

* * * * *